INTEGRATED VERSATILE DISPLAY CONTROL MECHANISM

Filed July 13, 1964 2 Sheets-Sheet 1

INVENTOR.
EVERETT E. McCOWN
BY
ATTORNEYS

Sept. 24, 1968 E. E. McCOWN 3,403,391

INTEGRATED VERSATILE DISPLAY CONTROL MECHANISM

Filed July 13, 1964 2 Sheets-Sheet 2

INVENTOR.
EVERETT E. McCOWN

BY

ATTORNEYS

United States Patent Office 3,403,391
Patented Sept. 24, 1968

3,403,391

INTEGRATED VERSATILE DISPLAY CONTROL MECHANISM

Everett E. McCown, San Diego, Calif., assignor to the United States of America as represented by the Secretary of the Navy Filed July 13, 1964, Ser. No. 382,422
5 Claims. (Cl. 340—324)

ABSTRACT OF THE DISCLOSURE

A display system wherein one or more consoles are arranged to simultaneously receive multiple category data signals from a single source which sequentially transmits each category of data signals to the consoles. The signals contain continually changing sequential positional information as might represent a moving target, vessel or aircraft. The multiple categories of data may be statically presented as symbols on a console and an operator at a console may select certain of these categories of data for dynamic display of the changing positional information, the console being responsive only to data in the category selected. In addition the selected categories of data may be transmitted into storage, processing or computing means as may be required.

The invention described herein may be manufactured and used by or for the Government of the United States of America for governmental purposes without the payment of any royalties thereon or therefor.

The present invention relates to a display control mechanism and more particularly, to a display control mechanism for use with the Navy Tactical Data Display System and specifically, to an integrated versatile display control mechanism for reading out and entering information into a computer associated with the Navy Tactical Display System and for digitally offsetting and range-scaling on the display mechanism.

The Navy Tactical Data System has been in use for some time as of the present and therefore a detailed explanation of the system will not be gone into. Let it be sufficient to say that the system utilizes high speed electronic computers and associated peripheral equipment for reading in and reading out information from associated computers. One of the vital components of the system is the display console where information from the computer is displayed and where information may be read into the computer.

The NTDS consoles now in existance comprise essentially a cathode ray display tube mounted approximately in the center of the console and a multiplicity of switches mounted on the periphery of the console. In essence the switches and controls comprise two main types i.e., those associated with category selection, intercept, air, sea, undersea, etc. and the action entry switches which are utilized to enter information into the computer for instance, gallons of fuel left in a particular intercept aircraft, number of rounds of ammunition, missiles, etc.

In operation, when the operator is observing the display console, various targets appear which are assigned to a particular category through the use of symbology i.e., a radar blip might be assigned as an intercept, an enemy, an unknown, etc. In addition, the consoles are assigned specific functions; that is to say, there may be an intercept console which is concerned only with the intercept function.

In the present systems, push buttons on associated panels are used to enter data and as well as present the output information desired. This corresponds to a bank of switches which may be push button, toggle, or multi-position switches. However, once designations are assigned to the buttons and the appropriate logic built into the system, the functions of the system are fixed. In addition, the multiplicity of switches is an expensive means of implementing the desired selection function. Further, the amount of information that can be entered, for instance, in an intercept situation, would require about forty-five buttons. A compromise may be made utilizing approximately twenty buttons in combination with rotary switches. However, this is an awkward way of entering information into the system and has obvious limitations. The same applies to entering information to the display from the computer.

In addition, it is desirable that the display be centered around a particular symbol in some instances. That is, let it be assumed that a symbol is displayed in, for instance, the upper right-hand quadrant of the CRT. The previous method of centering the display around a particular symbol involved the use of variable resistive elements which may be selectively manipulated by the operator, one of which is associated with the X axis and one with the Y axis.

Another function that is desired, is that the range scaling be digitally implemented so that the scale displayed on the CRT may be changed at the will of the operator, i.e. one time an increment of length might represent one mile while at another time the same increment might represent fifty miles.

The object of the present invention is to provide an improved tactical control console.

A further object of the present invention is to provide an improved integrated versatile display control mechanism for entering input data and presenting output information from a computer.

Another object of the present invention is to provide an integrated versatile display control mechanism having means for digitally offsetting and range scaling.

A further object of the present invention is to provide an integrated versatile display control mechanism which has having improved information handling capability and which utilizes standard logic functions.

Various other objects and many of the attendant advantages of this invention will be readily appreciated as the same becomes better understood by reference to the following detailed description when considered in connection with the accompanying drawings wherein.

Figure 3:
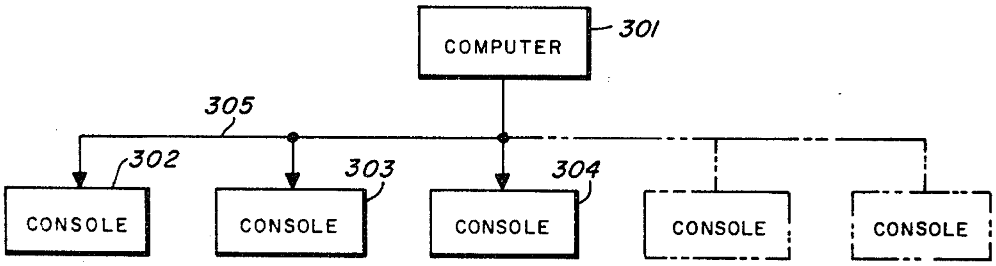
FIG. 3 is an overall block diagram of the system showing a computer and associated consoles.

In order to better understand the present invention reference is made to existing systems and the philosophy behind the present system. FIG. 3 illustrates a computer 301 and associated consoles 302, 303, 304 etc. which are fed from the computer. The output information from the computer is transmitted on a line, for instance 305, and the same information is fed to each one of the consoles.

A system such as the Air Force SAGE has a computer and associated consoles; however, in contrast to the present system, in the SAGE system the information is fed out from the computer to each of the consoles separately. This means that the category filtering is done at the computer end and the information which is unique to each console is sent only to that console. This arrangement calls for time sharing of the consoles with the computer and leads to a flicker on individual CRT's associated with each of the consoles.

The philosophy behind the present system is that the same information is sent to each of the consoles and each console itself does the selection of information data to be presented and of input data to be transmitted to the computer.

The system of FIG. 3 might be that aboard a single ship. In addition, the system would be a sub-unit of an entire data link; i.e., there might be a multiplicity of ships and the ships would be integrated through a data link so that not only the own ships information but also the other ships information would be present for use on the particular ship. In any case, the computer and peripheral consoles are set up so that information presented at each console and transmitted from each console is under the control of the respective operators; i.e., information is being updated and changed under the command of the operator at the individual console.

Not only is this being done but in addition, output information being generated by the computer is received at each one of the consoles. Consequently, the consoles may be unduly cluttered in a tactical situation if there were not a means of filtering out only the information which is to be displayed at a particular console. This leads to a discussion of FIG. 1 wherein a method is illustrated for suitably controlling input data to the console and output data transmitted from the console.

Figure 1:
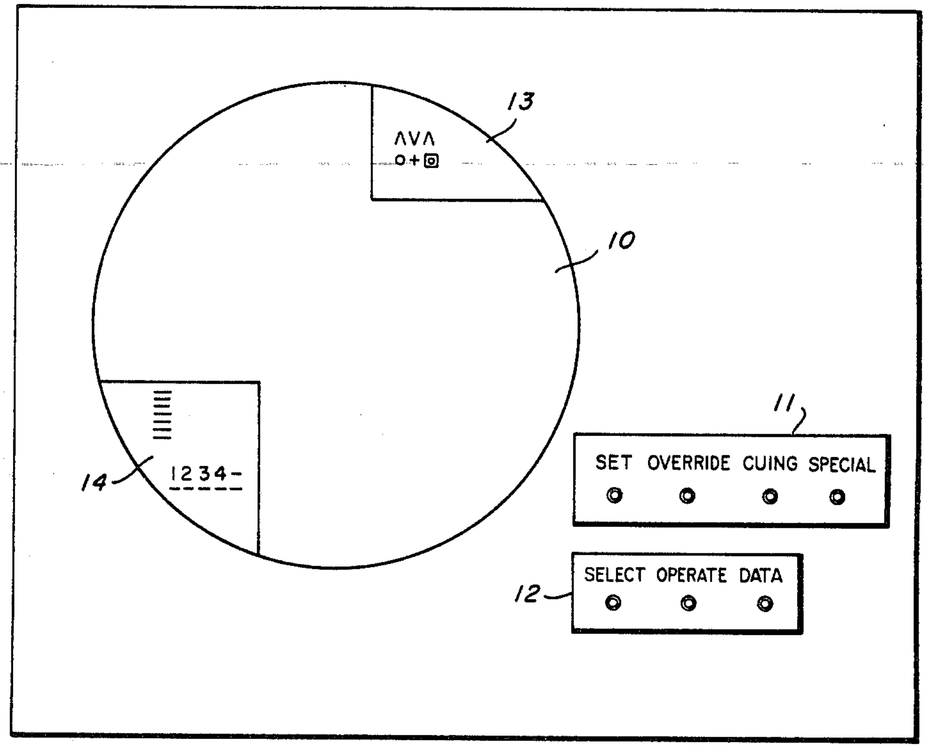
FIG. 1 is a schematic representation of the face of the CRT and associated symbology and control panels.

FIG. 1 illustrates the face of a CRT 10 with a category selection panel 11 and action entry panel 12 arranged on the console. The CRT 10 is shown as having category symbols in an area 13 in the upper right-hand quadrant of the CRT while in the lower left-hand quadrant there is an area 14 with a display of parameters and alpha-numerics. The category selection panel 11 is operatively associated with the category symbol area 13 while the action entry panel 12 is operatively associated with the area 14.

The category selection panel 11 has set, operate, override, cuing and special buttons which are under the control of the operator associated with the particular console. The action entry panel 12 has select, operate and data buttons which are also under the control of the operator. For the purposes of illustrating the method, let it be assumed that the particular apparatus which is represented by the schematic diagram of FIG. 1 is an intercept console. This means that the operator sitting in this position aboard the ship might be interested only in intercepts and hostile aircraft associated with the intercept.

In operation, the operator would depress the "set" button thereby calling up all the category symbols from the computer which are available in the computer program. This would comprise a static display in the area 13 on the face of the CRT 10. The operator then would select the appropriate symbols; i.e., the intercept and hostiles which correspond to the intercept category by means of a control ball or stick which would move an indexing hook (or appropriate indicator) around the desired symbol. The operator might also use an associated number or label or in actual practice as the present invention is implemented would use a light probe which is positioned over the symbol; as the scope is unblanked the light probe in effect provides a time address for that particular symbol. That is to say, the operator would position a light probe over the symbols corresponding to intercept and hostile air which would set storage flip-flops in the intercept console in a manner such that every time the six bit category words from the computer corresponding to intercept and hostile air were developed as output data of the computer, they would appear on the face of the CRT 10. In effect, the flip-flops at the intercept console are set up as selective filters so that every time a six bit word corresponding to hostile air and intercept air category arrive from the computer they are displayed on the face of the CRT. It must be understood at this time that the computer is being constantly fed information from the radar, sonar and communication links which identify the intercepts hostiles, underseas hostiles, air hostiles etc. so that this information is available in the computer. This also means that the information is available at all of the peripheral equipment.

After the selection is made, i.e., intercepts and air hostiles, the console is placed in an operational mode by depressing the operating button. Then all selected items appear on the face of the CRT in their spatially oriented positions.

The override button is provided on the category selection panel so that the operator may override the filtering that he has set up in the console and cause all category symbols which are available, to be displayed.

In the same manner, if the category selected were extensive, the operator might want to recall exactly what selections he made in the first instance. This would be done through the use of the cuing button; when this button is depressed all selections which were made are again displayed on the fact of the CRT in the area 13.

The "special" button on the category selection functions as a means of generating lines, circles, etc.

One feature of the present technique is that the computer is programmed to tell an associated symbol generator what symbology to generate and when to generate. New symbols are added by re-engineering the symbol generator as well as the digital filter (category selection switches and logic) for each console. With the apparatus and method described, future ship installation can have new symbols added by plugging into the symbol generator the necessary symbol cards with no re-engineering or modification to the display consoles (provided the storage flip-flops were included in the display console). This technique provides the choice of many more symbols and the selection of these symbols using the same five console category selection buttons, thus providing a much greater operational capability and flexibility.

The same philosophy holds true for the action entry panel and the associated parameters and alpha-numerics which are displayed in the area 14 on the console. In this instance, the parameters and alpha-numerics are provided so that information may be transmitted from the particular console to the computer. That is to say, again supposing an intercept console, let it be assumed that the information must be updated corresponding to a particular intercept. The operator would then depress the select button thereby displaying all of the available parameters and alpha-numerics in the area 14. These symbols might correspond to fuel, missiles, ammunition etc. along with the alpha-numerics so that one might select fuel and the number of gallons which would be entered into the computer for a particular intercept. The selection is done in the same manner once the select button is depressed. The light pencil is positioned over the parameter or alpha-numeric and the associated data is entered into the computer as information to be stored. Instead of a light pencil a track ball or joystick might be used. This information is then available to the entire data link network or to any of the other consoles associated with any of the computers.

Once the selection is made, the operate button is depressed which then makes that entry available for use at all consoles.

As a check on the system, the data button is provided which, when depressed, calls up the particular information in the form of parameters and alpha-numerics that was entered for a particular symbol.

Figure 2:
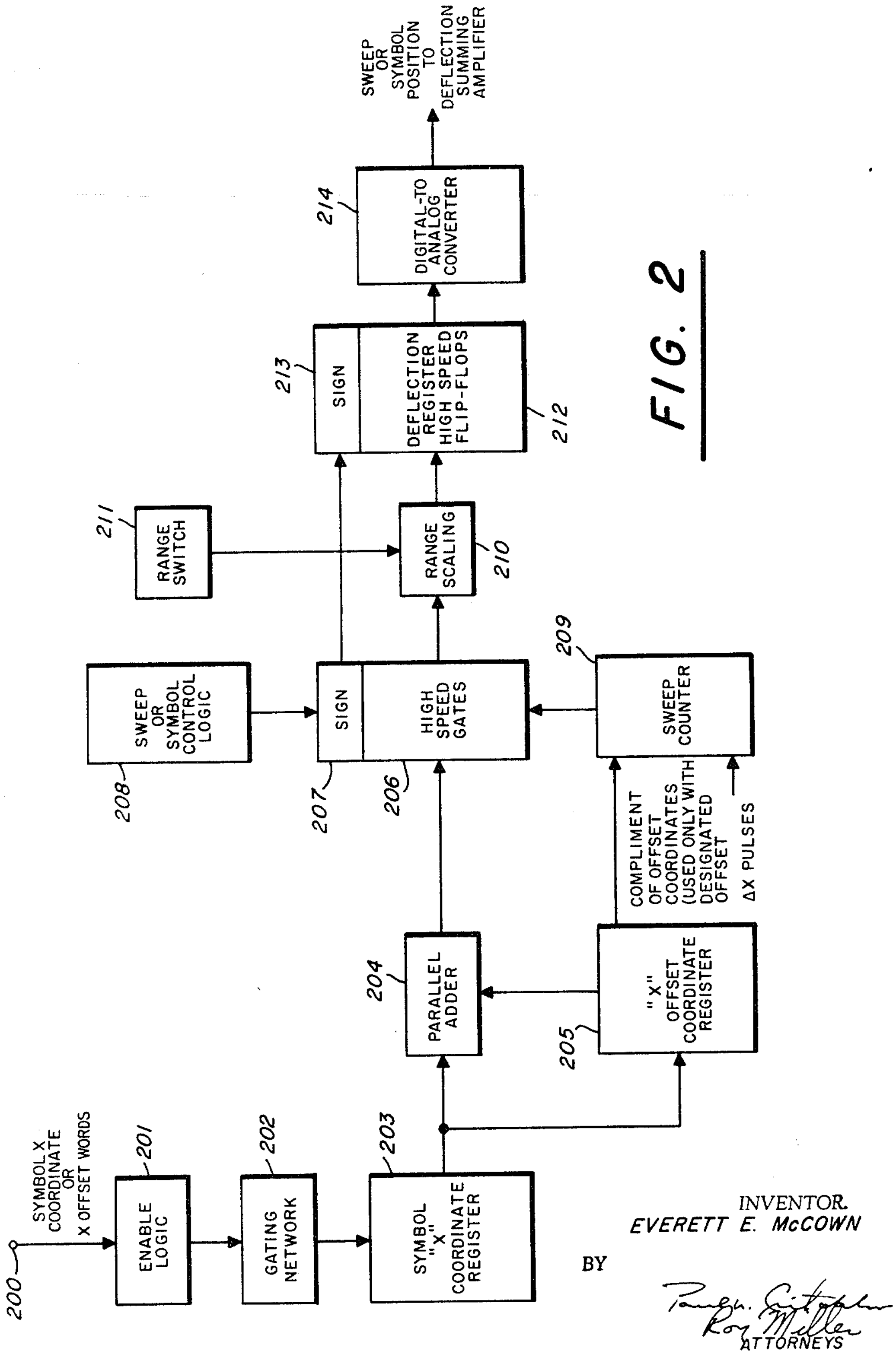
FIG. 2 is a block diagram of the integrated coordinate and offset function.

As a further function, it is very desirable that the display have the capability of being offset to center around any particular item of interest on the face of the CRT 10, not only as a desired area of interest, but also for digital range scaling. The means for digital offsetting and range scaling is illustrated in FIG. 2 wherein the X coordinate and offset logic is shown. The Y coordinate and offset logic is exactly the same as the X coordinate section, so that only the X section is shown in order to avoid unnecessary redundancy and duplication.

In FIG. 2 the symbol X coordinate and/or offset words are transmitted from the computer to the console at input 200 to an enable logic block 201. The output of the enable logic is coupled to a gating network 202 and the symbol X coordinate word is stored in an X coordinate register 203 which receives the output of the gating network 202. The output of the X coordinate register is coupled to a parallel adder 204 and also coupled to an X offset coordinate register 205 where the X offset is stored.

The output of the X offset register 205 is also coupled as another input to the parallel adder 204. The output of the parallel adder is coupled to a multiplicity of high speed gates contained in block 206 which also contains a sign portion 207 which tells whether it is positive or negative X that is being used.

In addition, a sweep-or-symbol control logic block 208 is provided. The output of the sweep-or-symbol control logic block 208 is coupled into the high speed gates 206 as well as the output of a sweep counter 209. The sweep counter 209 derives two inputs, one corresponding to the complement of the offset coordinates from the offset coordinate register 205, and the other $\Delta x$ pulses from a radar distribution switchboard, not shown. The $\Delta x$ pulses, in fact, come from a radar azimuth converter which is directly coupled to a radar antenna.

The output of the high speed gates contained in block 206 is coupled to a range scaling block 210 which has an input from a range switch control 211. The output of the range scaling block is coupled to a deflection register 212 comprising high speed flip-flops, which also contains a sign portion 213 for determining whether it is negative or positive X. The output of the deflection register 212 is coupled to a digital-to-analog converter 214 and the output of the converter 214 comprises sweep-or-symbol position information for the deflection summing amplifiers of the CRT, not shown.

In operation, the X coordinate and/or X offset words are received at input 200. In order to understand the X offset function, it must be understood that the operator of the console has entered the amount of X offset and Y offset into the computer, by means of a track ball, for instance, so that these words are available to the consoles. In any event, the X coordinate and/or X offset words are transmitted to the enable logic 201 which tells the console when to look at the particular words. The output of the enable logic 201 is transmitted to the gating network 202 which is in fact nothing more than an AND gate matrix for sorting the bits comprising the digital words as they come from the enable logic 201. The X coordinate output of the gating network 202 is stored in the symbol X coordinate register 203 which acts as a buffer. In addition, the X offset coordinate is stored in the X offset coordinate register 205 so that it is available for modifying the X coordinate in the parallel adder 204. That is to say, the X coordinate is modified by a predetermined amount due to the amount of X offset.

At this time the display on the CRT may comprise either a sweep display of the raw radar and/or the symbols which are being received from the computer. The particular display function depends on the setting of the sweep-or-symbol logic block 208. If the block 208 is set so that the symbols are displayed, the output of the sweep counter 209 is not pertinent and will not show up on the display. However, if the control logic 208 is set so that the sweep is being sent to the display, $\Delta X$ pulses which are received at the sweep counter 209 are transmitted into the high speed gates 206 and fed out to the CRT. Both sweep and symbol information may be displayed as well. The input to the sweep counter 209 comprises $\Delta X$ pulses corresponding to radar azimuth which are then modified by the complement of the offset coordinates as received from the X offset register 205.

The output of the parallel adder 204 is gated through the AND gates 206 to the range scaling block 210. The range scaling element 210 is under the control of the range switch 211 which determines the scale value to be given to the binary digits. This is performed by doing a binary shift on the digits comprising the output of the high speed gates 206.

The output of the range scaling element 210 is entered into the deflection registers 212 which comprise a series of flip-flops for storing the information. The stored information is then read into the digital-to-analog converter 214 so that the symbols and/or sweep may be displayed on the associated CRT in analog form.

At the same time one must determine whether there is positive or negative sign associated with the X function. This is accomplished in the sign portion 207 of the high speed gates 206 and the sign portion 213 of the deflection register 212.

The present invention comprising the integrated versatile display control mechanism affords versatility and flexibility in the selection, presentation, and use of data information not heretofore possible in existing systems. The integrated versatile display control mechanism one is able to have a multiplicity of consoles which are fed by one computer, each display having a large capability for category selection and action entry using very few controls or switches. In addition, due to the fact that the entire system is digital, the digital offset and range scaling is wholly compatible and allows the operator complete control and flexibility over the symbols and/or functions being displayed on the particular console under the command of the computer. The offset function may be operatively updated periodically either under the control of the operator or automatically by the computer.

In addition, through the use of the category selection and action entry inputs as shown, a great degree of flexibility and simplicity is had as to the number of categories that may be selected and the number of parameters and alpha-numerics that may be entered. This means that each of the consoles is entirely flexible and may take over any other function or perform any function in contrast to known, present systems wherein an individual console is limited by the number of switches which may be placed on the control panels. Moreover, in accordance with the concept of the new system, additional symbols or action entry faciilties can be added without changes to the consoles.

Obviously many modifications and variations of the present invention are possible in the light of the above teachings. It is therefore to be understood that within the scope of the appended claims the invention may be practiced otherwise than as specifically described.

What is claimed is:

1. An integrated versatile display control apparatus comprising:

a source of multiple category data signals including sequential positional information contained in digital code, at least one console connected to receive said data signals and responsive to said digital code for presenting discrete characters symbolic of each of said multiple categories and spatially disposed relative to a predetermined frame of reference in accordance with positional information contained in said digital code data;

means for statically presenting the categories of data information available from said source;

selection means for designating a desired category of available data information;

logic means responsive to said selection means for rejecting all data information received from said source except digital code signals corresponding to said desired category;

means for presenting multiple information characters;

means for designating selected information characters representative of information data related to said desired category;

means for transmitting said information data for entry into and storage in said multiple category data signal source.

2. An integrated versatile display control apparatus as claimed in claim 1 and including a plurality of consoles, each adapted for selecting, presenting and transmitting digitally coded data signals as claimed therein.

3. An integrated versatile display control apparatus as claimed in calim 1 wherein said means for presenting the categories of information available from said data signal source and said means for presenting multiple information characters are operative to produce said respective presentations at predetermined positions separate from said symbolic category characters spatially disposed relative to said predetermined frame of reference.

4. An integrated versatile display control apparatus as claimed in claim 1 and including control means for digitally offsetting said presented data information relative to said predetermined frame of reference.

5. An integrated versatile display control apparatus as claimed in claim 1 and incuding means for selectively changing the scale of said presented data information relative to said predetermined frame of reference.

References Cited

UNITED STATES PATENTS

| | | | |
|---|---|---|---|
| 3,110,006 | 11/1963 | Albrighton et al. | 340—23 |
| 3,123,800 | 3/1964 | Phelps | 340—23 |

JOHN W. CALDWELL, *Primary Examiner.*

A. J. KASPER, *Assistant Examiner.*